Jan. 27, 1959     J. A. C. KINNEAR     2,870,524
MANUFACTURE OF WAVEGUIDE COMPONENTS
Filed May 10, 1954     2 Sheets-Sheet 1
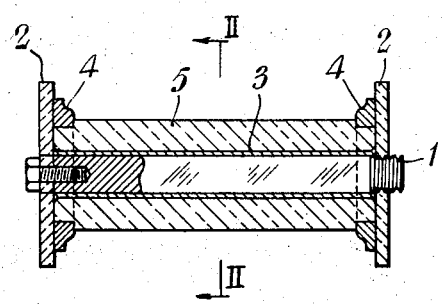
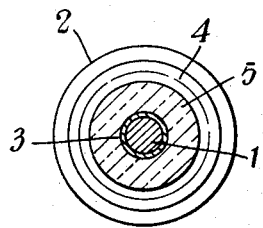
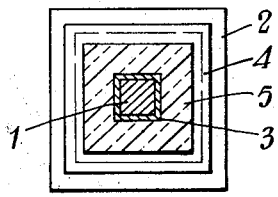
INVENTOR
John Alexander Christie Kinnear
By Bailey, Stephens and Huettig
Attorneys Jan. 27, 1959 J. A. C. KINNEAR 2,870,524
MANUFACTURE OF WAVEGUIDE COMPONENTS
Filed May 10, 1954 2 Sheets-Sheet 2

JOHN ALEXANDER CHRISTIE KINNEAR
INVENTOR

By Bailey, Stephens & Huettig
ATTORNEYS

United States Patent Office 2,870,524
Patented Jan. 27, 1959

2,870,524

MANUFACTURE OF WAVEGUIDE COMPONENTS

John Alexander Christie Kinnear, Bromley, England, assignor to Elliott Brothers (London) Limited, London, England, a company of Great Britain Application May 10, 1954, Serial No. 428,569

Claims priority, application Great Britain May 18, 1953

5 Claims. (Cl. 29—155.5)

This invention relates to the manufacture of waveguide components, that is to say those parts of equipment employed in the transmission, measurement and so on of high frequency electromagnetic waves which embody a length of waveguide into or through which the high frequency energy is to be conducted.

It is often found desirable to produce the waveguide section of a waveguide component by electrolytic deposition of a suitable metal upon a mandrel which is later removed from the metal shell produced. However, difficulty is often experienced in providing a means of coupling the waveguide section thus produced to other equipment. Moreover, when the wavelength of the high frequency energy for which the component is designed is in the region of a few centimetres are less, the close tolerances of the size of the waveguide aperture which are necessary in the manufacture of precision equipment, such for example as precision matched loads, make it desirable that all machining operations on the exterior of the waveguide section be performed before the electroforming mandrel is withdrawn.

In such cases the electrodeposition must be continued until a considerable thickness of metal has been built up, and this gives rise to the following disadvantages:

(1) The stresses set up in the metal in depositing it to such a thickness may make it difficult to withdraw the mandrel and may result in some deformation of the waveguide aperture.

(2) Owing to the fact that the metal is deposited preferentially on convex surfaces, those regions of a component having such surfaces will build up to undesirably large thickness by the time that the other regions of the component have built up to an adequate thickness.

(3) The time required to deposit an adequate thickness of metal may amount to weeks and this necessitates the use of many mandrels and the provision of considerable vat space if quantity production of the components is to be achieved. Production costs are thereby increased considerably.

The object of the present invention is to provide an improved and simple method of manufacturing waveguide components which shall not be subject to these disadvantages.

According to the invention, a method of manufacturing a waveguide component comprises the steps of electrodepositing a thin metallic shell on a mandrel, encasing the shell in a fluid or plastic material which is capable of assuming a relatively hard and rigid final form, and causing or allowing the material to assume said final form.

The encasing material may be a plastic, for example, a cold-setting resin, or a metallic alloy having a low melting point and initially applied in the molten state. As will be understood, the encasing material may be moulded or cast to any required external shape in the process of investing the metallic shell. In the case of a plastic material, this may have incorporated therein a filler adapted to produce a desirable external appearance on the finished component.

If desired, the encasing material, when in its final form, may be machined at one or each end into the form of a standard waveguide coupling part. Alternatively, it may be employed to locate a separately formed metal coupling flange and to bond this to the metallic shell. Yet again, the encasing material may constitute a bond between the metallic shell and a surrounding casing of metal or other material carrying the necessary coupling flange or flanges.

By suitably arranging a smooth flat end cheek of a solid dielectric material, such as glass, on the electroforming mandrel prior to effecting the electrodeposition of the metallic shell, it can be ensured that the corresponding end of the shell will be formed with smooth flat surface normal to the axis of the mandrel which will not require machining after withdrawal of the mandrel. Preferably, the encasing material is also moulded or cast around the shell while the mandrel and end cheek are in position, and a coupling flange may be located against the end cheek coaxial with the mandrel during the moulding or casting operation so that the component produced will have a square smooth coupling face requiring no machining.

The invention will now be described by way of example with reference to the accompanying drawings, in which:

Figure 1 is a section taken on the line I—I of Figure 2, illustrating a waveguide component of rectangular cross-section with the mandrel and end cheeks still in position;

Figure 2 is a section taken on the line II—II of Figure 1;

Figure 3 is a view similar to Figure 2 showing a circular section waveguide component;

Figure 4:
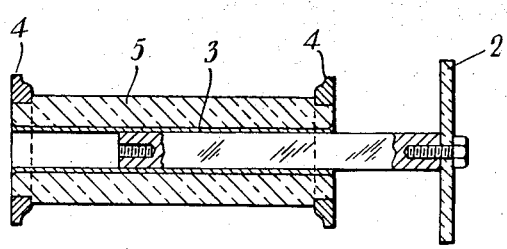
Figure 4 is a view similar to that of Figure 1 showing the mandrel partially withdrawn from the completed waveguide.

In an example of the way in which the invention may be carried out in practice which is illustrated by Figures 1 and 2 of the accompanying drawings, a stainless steel mandrel 1 of rectangular cross-section has a pair of smooth flat circular glass end cheeks 2 mounted thereon at a distance apart corresponding to the required length of the waveguide component to be produced. Copper is electrodeposited on the mandrel 1 between the end cheeks 2 to build up a thin metallic shell 3. One of the cheeks 2 is then removed and two annular brass elements 4 to constitute coupling flanges are located around the mandrel whereupon the end cheek is reattached to the mandrel. The assembly is then placed in a two-part mould 6, 6a as shown in Figures 5 and 6, the mould parts having suitably recessed ends to receive and locate the elements 4 and the peripheral edges of the cheeks 2 so that the elements 4 are located concentrically against the inner faces of the cheeks 2. A mass 5 (Figures 1 to 4) of a cold-setting resin (introduced through an aperture 6b in the upper mould part 6) is cast or moulded around the shell 3 between the end cheeks and the mould parts 6, 6a to a thickness such that it embeds the inner parts of the brass elements 4. The finished component obtained when the resin has set and the mold parts 6, 6a, the mandrel 1 and end cheeks 2 have been removed, has adequate strength and rigidity, has internal walls of good electrical conductivity which are smooth and accurately dimensioned, and has square ends which are smooth and flat and carry couplings flanges firmly bonded in position.

Figures 5, 6:
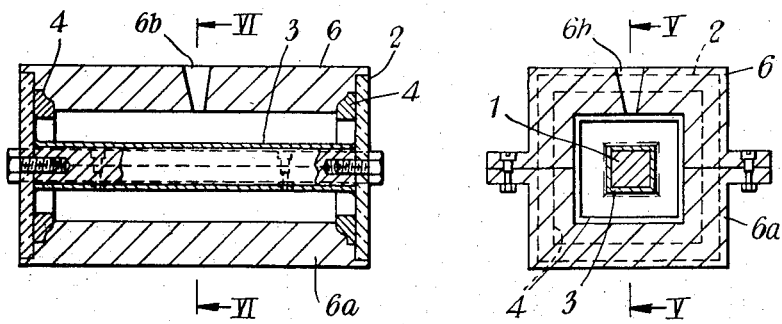
Figure 5 is a section taken on the line V—V of Figure 6 showing the mandrel with its electroform coating and the end cheeks mounted with coupling flanges in a mould in readiness for the casting or moulding operation.
Figure 6 is a section taken on the line VI—VI of Figure 5.

The end cheeks 2 may either be threaded over the mandrel 1 (as shown at the right-hand end in the figure) or be secured on the ends thereof by the aid of screws or the like (as shown at the left-hand end in Figure 1 and at both ends in Figures 4 and 5).

Figure 3 illustrates the manufacture of a waveguide component of circular cross-section, this being carried out in a manner similar to that described with reference to Figures 1 and 2, like reference numerals being used to denote similar parts. A thin copper shell 3 is electrodeposited on a stainless steel mandrel 1 of circular section between the end cheeks 2. Although the latter are shown as being circular they may be any desired shape as may the cross-section of the mass 5 of a cold-setting resin.

The cold-setting resin may in both the above examples contain a filler adapted to give the component a desirable external appearance or it may be replaced by a low melting point alloy. Alternatively, the resin or plastic material may have incorporated therein a filler adapted to absorb any energy propagated through the waveguide component when in use.

What I claim is:

1. A method of manufacturing a waveguide component embodying a length of waveguide capable of conducting high frequency electromagnetic energy which comprises the steps of securing a detachable electrically non-conducting plane end cheek tightly in contact with each end face of a mandrel having a smooth electrically conducting external surface, electrodepositing on said external surface between said end cheeks a thin metallic shell which is to constitute the conducting wall of the waveguide, detaching one of said end cheeks from said mandrel, locating two annular coupling flanges around said mandrel, re-securing said detached end cheek to said mandrel, surrounding said mandrel between said end cheeks by a retaining wall which leaves an annular space between its inner surface and the metallic shell on the mandrel and co-operates with said end cheeks to locate each annular coupling flange concentrically with said mandrel in contact with the inner face of the adjacent end cheek, filling said annular space with a fluid material which is capable of assuming a relatively hard and rigid final form, causing said material to assume said final form and thereby bond said flanges to said shell, detaching one of said end cheeks from said mandrel and extracting said mandrel from said shell.

2. A method as claimed in claim 1, including the step of removing said retaining wall after said material has assumed said final form.

3. A method as claimed in claim 1, in which said material is a plastic.

4. A method as claimed in claim 3, in which said material is a cold-setting resin.

5. A method as claimed in claim 1, in which said material is a low melting point metallic alloy.

References Cited in the file of this patent

UNITED STATES PATENTS

| | | |
|---|---|---|
| 2,357,950 | Goessling | Sept. 12, 1944 |
| 2,381,367 | Quayle | Aug. 7, 1945 |
| 2,447,541 | Sabee et al. | Aug. 24, 1948 |
| 2,518,892 | Hollingsworth | Aug. 15, 1950 |
| 2,528,367 | Iams | Oct. 31, 1950 |
| 2,559,141 | Williams | July 3, 1951 |
| 2,592,614 | Stoddard | Apr. 15, 1952 |
| 2,682,500 | Tanner | June 29, 1954 |
| 2,696,834 | Carr | Dec. 14, 1954 |